(12) United States Patent
Nomura et al.

(10) Patent No.: US 12,333,421 B2
(45) Date of Patent: Jun. 17, 2025

(54) SYNAPTIC CIRCUIT AND NEURAL NETWORKING APPARATUS

(71) Applicant: KABUSHIKI KAISHA TOSHIBA, Tokyo (JP)

(72) Inventors: Kumiko Nomura, Tokyo (JP); Yoshifumi Nishi, Yokohama Kanagawa (JP); Takao Marukame, Tokyo (JP); Koichi Mizushima, Kamakura Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 962 days.

(21) Appl. No.: 17/461,590

(22) Filed: Aug. 30, 2021

(65) Prior Publication Data

US 2022/0269932 A1    Aug. 25, 2022

(30) Foreign Application Priority Data

Feb. 24, 2021    (JP) .................................. 2021-027592

(51) Int. Cl.
*G06N 3/065*    (2023.01)
*G06N 3/049*    (2023.01)
*G06N 3/08*    (2023.01)

(52) U.S. Cl.
CPC ............. *G06N 3/065* (2023.01); *G06N 3/049* (2013.01); *G06N 3/08* (2013.01)

(58) Field of Classification Search
CPC ........... G06N 3/065; G06N 3/049; G06N 3/08
See application file for complete search history.

(56) References Cited

U.S. PATENT DOCUMENTS

2013/0132314 A1\*   5/2013   Snider .................... G06N 3/065
                                                      706/15
2016/0034812 A1\*   2/2016   Gibson .................... G06N 3/08
                                                      706/25

OTHER PUBLICATIONS

Zhang, Malu, et al. "Supervised learning in spiking neural networks with synaptic delay-weight plasticity." Neurocomputing 409 (2020): 103-118. (Year: 2020).\*
Elisabetta Chicca et al., "Neuromorphic Electronic Circuits for Building Autonomous Cognitive Systems," Proc. of the IEEE, vol. 102, No. 9, pp. 1367-1388 (2014).

\* cited by examiner

*Primary Examiner* — Eric Nilsson
(74) *Attorney, Agent, or Firm* — Finnegan, Henderson, Farabow, Garrett & Dunner, LLP

(57) ABSTRACT

A synaptic circuit according to an embodiment is a circuit in which a weight value changed by learning is set. The synaptic circuit receives a binary input signal from a pre-synaptic neuron circuit and outputs an output signal to a post-synaptic neuron circuit. The synaptic circuit includes a propagation circuit and a control circuit. The propagation circuit supplies, to the post-synaptic neuron circuit, the output signal obtained by adding an influence of the weight value to the input signal. The control circuit stops output of the output signal from the propagation circuit to the post-synaptic neuron circuit when the weight value is smaller than a predetermined reference value.

11 Claims, 8 Drawing Sheets

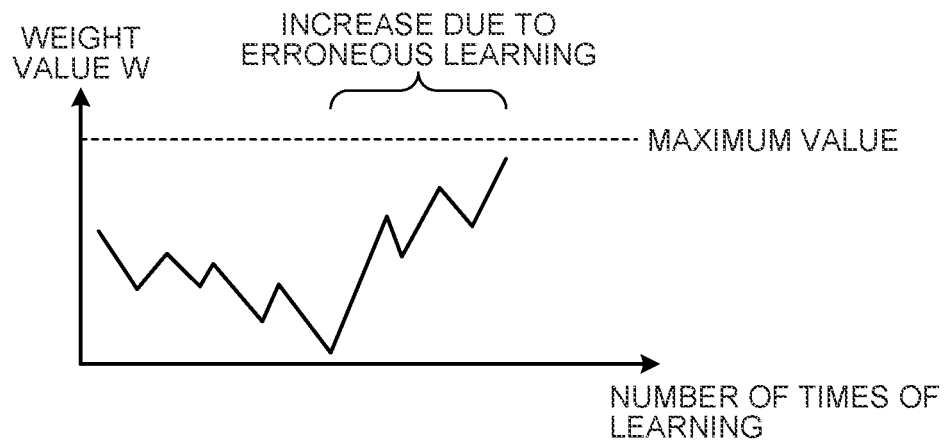
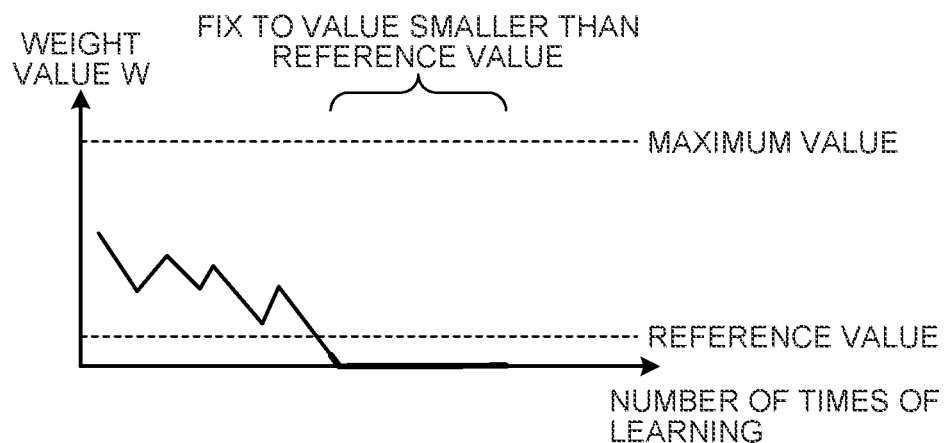

EXAMPLE OF NOT STOPPING OUTPUT

EXAMPLE OF STOPPING OUTPUT
WHEN WEIGHT VALUE IS SMALLER
THAN REFERENCE VALUE

*# SYNAPTIC CIRCUIT AND NEURAL NETWORKING APPARATUS

CROSS-REFERENCE TO RELATED APPLICATIONS

This application is based upon and claims the benefit of priority from Japanese Patent Application No. 2021-027592, filed on Feb. 24, 2021; the entire contents of which are incorporated herein by reference.

FIELD

Embodiments described herein relate generally to a synaptic circuit and a neural network apparatus.

BACKGROUND

In recent years, a technology that realizes a neuromorphic processor by using a hardware-based neural network has been proposed. Such a neuromorphic processor includes a synaptic circuit. In the synaptic circuit, a weight value representing weight is set, and a signal obtained by adding the influence of the weight value to a signal received from a pre-synaptic neuron is given to a post-synaptic neuron.

The weight value set in the synaptic circuit is updated in accordance with a predetermined learning method. As a learning method for a neuromorphic processor, learning using spike-timing-dependent synaptic plasticity (STDP) has been known.

In the STDP learning, when a post-synaptic neuron disposed next to a pre-synaptic neuron fires in response to firing of the pre-synaptic neuron, a weight value set in a synaptic circuit between the pre-synaptic neuron and the post-synaptic neuron is changed to increase. On the other hand, the STDP learning decreases the weight value set for the synaptic circuit between a pre-synaptic neuron, which hardly fires, and a post-synaptic neuron. Therefore, the STDP learning is capable of increasing the weight value of a synaptic circuit between neurons having strong association, and decreasing the weight value of a synaptic circuit between neurons having weak association.

By the way, there is a case that one of pre-synaptic neurons frequently fires when the weight value is updated by the STDP learning. Such a case has an increase in the probability that the firing timing of another pre-synaptic neuron having a low firing frequency accidentally coincides with the firing timing of a post-synaptic neuron. In such a case, the STDP learning determines that the association between the pre-synaptic neuron having a low firing frequency and the post-synaptic neuron is strong, and increases the weight value set for the synaptic circuit. For this reason, there is a case where the STDP learning increases the weight value of a synaptic circuit between a pre-synaptic neuron and a post-synaptic neuron having low association with each other due to an influence of the frequently firing pre-synaptic neuron in the middle of learning.

Moreover, if the weight value between neurons having such low association is increased in the middle of learning, there is a possibility that the time for convergence of learning becomes long. In addition, there remains a possibility that the neural network cannot be learned until an accurate result is obtained, and there is also a possibility that the accuracy of the neural network cannot be stabilized.

BRIEF DESCRIPTION OF THE DRAWINGS

FIG. 6 is a diagram illustrating an example of a weight value for the number of times of learning in a case where output is not stopped;

FIG. 7 is a diagram illustrating an example of a weight value for the number of times of learning in a case where output is stopped;

DETAILED DESCRIPTION

A synaptic circuit according to an embodiment is a circuit in which a weight value changed by learning is set. The synaptic circuit receives a binary input signal from a pre-synaptic neuron circuit and outputs an output signal to a post-synaptic neuron circuit. The synaptic circuit includes a propagation circuit and a control circuit. The propagation circuit is configured to supply, to the post-synaptic neuron circuit, the output signal obtained by adding an influence of the weight value to the input signal. The control circuit is configured to stop output of the output signal from the propagation circuit to the post-synaptic neuron circuit when the weight value is smaller than a predetermined reference value.

Hereinafter, a neural network apparatus 10 according to an embodiment will be described with reference to the drawings. The neural network apparatus 10 according to the embodiment is implemented by hardware. The neural network apparatus 10 is capable of shortening the time fix convergence of learning and stabilizing the accuracy of learning. As a result, the neural network apparatus 10 according to the embodiment can execute accurate inference.

Figure 1:
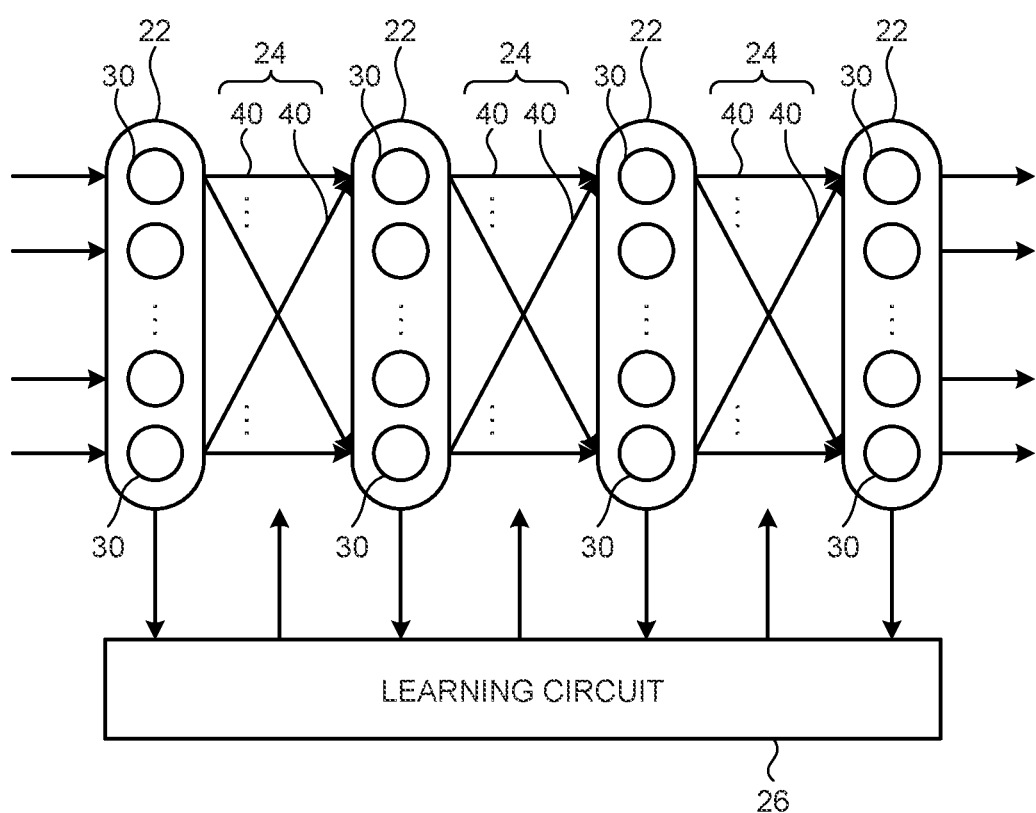
FIG. 1 is a diagram illustrating an example of a neural network apparatus according to an embodiment.

FIG. 1 is a diagram illustrating an example of the neural network apparatus 10 according to the embodiment. The neural network apparatus 10 includes an N-stage layers 22 (N is an integer equal to or larger than 2), N−1 synapses 24, and a learning circuit 26.

Each of the N-stage layers 22 includes a plurality of neuron circuits 30. Each of the neuron circuits 30 acquires signals output from the pre-synaptic layer 22, and executes product-sum operation processing on the acquired signals. The first-stage layer 22 of the N-stage layers 22 acquires signals from an external device or from an input layer. Then, each of the neuron circuits 30 outputs a signal obtaining by performing activation function processing on a signal representing the product-sum operation result. Each of the neuron circuits 30 executes the product-sum operation processing and the activation function processing by an analog circuit, for example.

Each of the N−1 synapses 24 includes a plurality of synaptic circuits 40. Each of the synaptic circuits 40 has a weight value set by the learning circuit 26.

The n-th (n is an integer equal to or larger than 1 and equal to or less than (N+1)) synapse 24 in the N+1 synapses 24 is disposed between the n-th-stage layer 22 and the (n+1)-th-stage layer 22.

Each of the synaptic circuits 40 included in the n-th synapse 24 receives, as a binary input signal, a signal output from one of the neuron circuits 30 included in the n-th-stage layer 22. Each of the synaptic circuits 40 included in the n-th synapse 24 generates an output signal obtained by adding the influence of the set weight value to the received input signal. In the present embodiment, the output signal is a binary voltage signal. Alternatively, the output signal may be a current represented by an analog value (continuous value) or a voltage represented by an analog value (continuous value). Then, each of the synaptic circuits 40 included in the n-th synapse 24 gives an output signal to one of neuron circuits 30 included in the (n+1)-th-stage layer 22.

The learning circuit 26 updates a weight value having been set in each of the synaptic circuits 40. The learning circuit 26 updates, by spike-timing-dependent synaptic plasticity (STDP) learning, the weight value set in each of the synaptic circuits 40.

In such the neural network apparatus 10, the first-stage layer 22 receives one or more signals from an external device or from an input layer. Then, the neural network apparatus 10 outputs, from the N-th-stage layer 22, one or more signals representing the result of executing a calculation by the neural network with respect to the one or more received signals.

Figure 2:
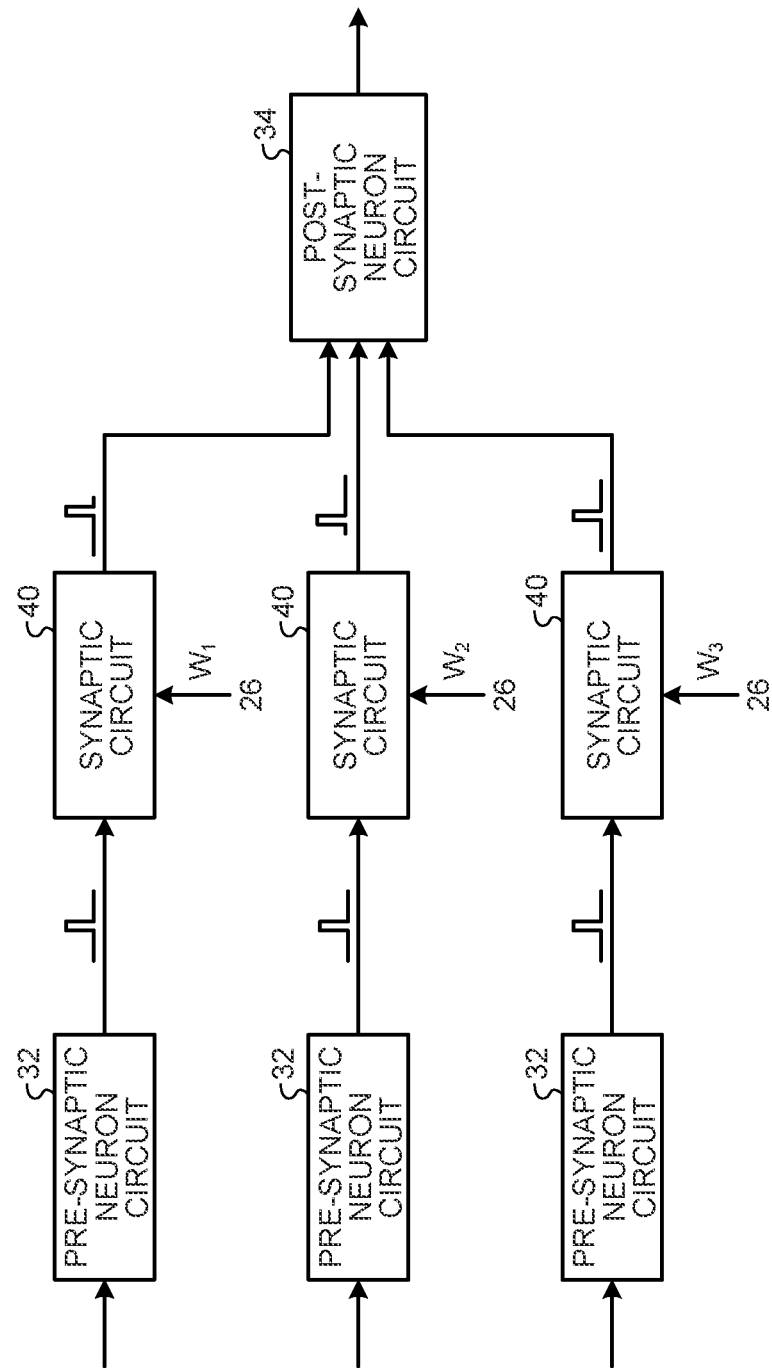
FIG. 2 is a diagram illustrating a connection relation among synaptic circuits.

FIG. 2 is a diagram illustrating the connection relation among the synaptic circuits 40. In the synaptic circuit 40, the weight value is set by the learning circuit 26.

The synaptic circuit 40 receives a binary input signal from a pre-synaptic neuron circuit 32 which is any of the neuron circuits 30 included in the pre-synaptic layer 22. The synaptic circuit 40 outputs an output signal obtained by adding the influence of the weight value to the received binary input signal. The three synaptic circuits 40 illustrated in FIG. 2 are each given a weight value ($W_1$; $W_2$; $W_3$) set by the learning circuit 26.

In the present embodiment, the synaptic circuit 40 outputs a binary output signal obtained by delaying a binary input signal by a time corresponding to the set weight value. In other words, in the present embodiment, the synaptic circuit 40 outputs an output signal that causes the firing timing of the pre-synaptic neuron circuit 32 to delay by a time corresponding to the set weight value. For example, the synaptic circuit 40 shortens the delay time between reception of the input signal and output of the output signal as the set weight value is larger. Then, the synaptic circuit 40 gives the output signal to a corresponding post-synaptic neuron circuit 34.

It is to be noted that, when the input signal fires, the synaptic circuit 40 may output an output signal that is a current having a current amount corresponding to the set weight value. In addition, the synaptic circuit 40 may output an output signal that is a current having a current amount corresponding to a value obtained by multiplying the firing time or the number of firing times of the input signal by the set weight value. In this case, the synaptic circuit 40 increases the current amount of the output signal as the set weight value is larger. In this case, the post-synaptic neuron circuit 34 receives an output signal represented by an analog value (continuous value) from the synaptic circuit 40. In addition, similarly, the synaptic circuit 40 may output an output signal represented by a voltage value instead of the current value.

Figure 3:
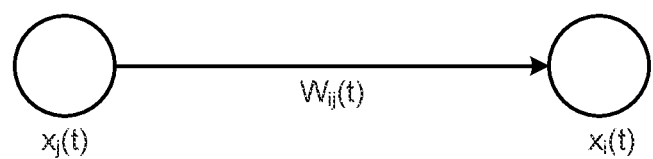
FIG. 3 is a diagram for explaining processing by a learning circuit.

FIG. 3 is a diagram for explaining the processing by the learning circuit 26. The learning circuit 26 updates a weight value having been set in each of the synaptic circuits 40. The learning circuit 26 updates, by spike-timing-dependent synaptic plasticity (STDP) learning, the weight value having been set in each of the synaptic circuits 40.

The learning circuit 26 updates the weight value set in a certain synaptic circuit 40 (first synaptic circuit 40-1) in accordance with Equation (1).

$$W_{ij}(t+\Delta t)=W_{ij}(t)+\Delta W_{ij}(t) \tag{1}$$

In Equation (1), $\Delta t$ denotes a unit time, t denotes an arbitrary time, and (t+$\Delta t$) denotes the time after the unit time $\Delta t$ has elapsed from the time t.

Moreover, $W_{ij}(t)$ represents the weight value set in the first synaptic circuit 40-1 at the time (t), and $W_{ij}(t+t\Delta)$ represents the weight value set in the first synaptic circuit 40-1 at the time t+$\Delta t$.

Here, $\Delta W_{ij}(t)$ is calculated by Equation (2).

$$\Delta W_{ij}(t)=\eta_{STDP}(x_i(t)\times(t-\Delta t)-x_i(t-\Delta t)\times x_j(t)) \tag{2}$$

In Equation (2), (t−$\Delta t$) denotes the time before the unit time $\Delta t$ from the time t, and $\eta_{STDP}$ denotes a predetermined constant.

Moreover, $x_i(t)$ denotes the value of the signal output from the post-synaptic neuron circuit 34 connected to the first synaptic circuit 40-1 at the time t, and $x_j(t)$ denotes the value of the signal that is output from the pre-synaptic neuron circuit 32 connected to the first synaptic circuit 40-1 at the time t.

Additionally, $x_i(t-\Delta t)$ denotes the value of the signal output from the post-synaptic neuron circuit 34 connected to the first synaptic circuit 40-1 at the time t−$\Delta t$, and $x_j(t-\Delta t)$ denotes the value of the signal output from pre-synaptic neuron circuit 32 connected to the first synaptic circuit 40-1 at the time t−$\Delta t$.

Note that $x_i(t)$, $x_j(t)$, $x_i(t-\Delta t)$, and $x_j(t-\Delta t)$ take a value of 0 or 1. In addition, $x_i(t)$, $x_j(t)$, $x_i(t-\Delta t)$, and $x_j(t-\Delta t)$ represent firing when taking a value of 1.

In Equation (2), $\Delta W_{ij}(t)$ becomes $\eta_{STDP}$ when the pre-synaptic neuron circuit 32 fires at the time t−$\Delta t$ and the pre-synaptic neuron circuit 32 fires at the time t after the unit time $\Delta t$. Otherwise $\Delta W_{ij}(t)$ becomes 0.

Specifically, in response to firing of the signal having been output from the pre-synaptic neuron circuit 32, the learning circuit 26 increases, by a predetermined amount, the weight value set in the synaptic circuit 40 in the case where the signal having been output from the post-synaptic neuron circuit 34 fires. Due to this, the learning circuit 26 can perform STDP learning on the weight values set in each of the synaptic circuits 40.

Furthermore, the learning circuit 26 executes normalization processing in order to prevent the weight values of the synaptic circuits 40 from becoming too large to perform appropriate inference. In the normalization processing, the learning circuit 26 adjusts, to become equal to or less than a constant value, the sum of the weight values set in the synaptic circuits 40 connected to the input stage of one neuron. This makes it possible for the learning circuit 26 to uniformly reduce the weight values to appropriately fire the neuron. Note that the learning circuit 26 may execute other processing instead of or in addition to the normalization processing as long as the weight value set for the synaptic circuit 40 between neurons having strong association can be made relatively large and the weight value set for the synaptic circuit 40 between neurons having weak association can be made relatively small.

The neural network apparatus 10 is not limited to a forward propagation network but may be a recursive network. That is, the neural network apparatus 10 may be a recurrent neural network having a recursive structure in which a signal output from the first layer of the plurality of layers is fed back to the first layer or to a layer arranged in a stage before the first layer. Moreover, the neural network apparatus 10 may have a configuration in which some layers are arranged in parallel or a configuration in which part of the network is branched.

Figure 4:
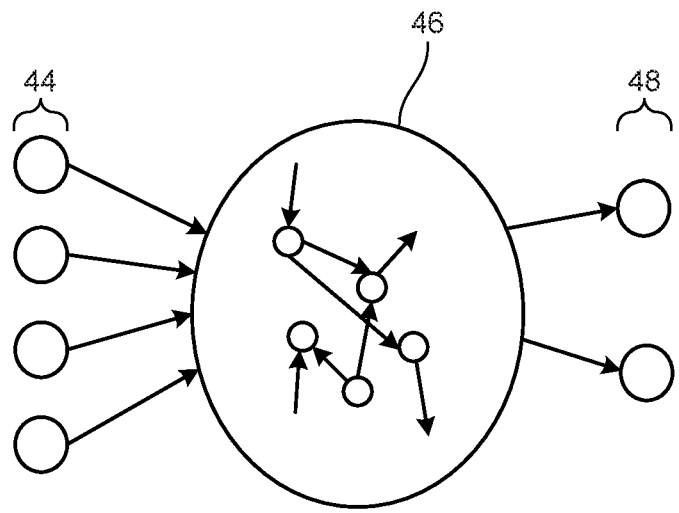
FIG. 4 is a diagram illustrating a configuration of reservoir computing.

FIG. 4 is a diagram illustrating the configuration of reservoir computing. The reservoir computing includes an input layer 44, a reservoir layer 46, which is a recurrent neural network, and an output layer 48. The neural network apparatus 10 may be used as the reservoir layer 46 in such reservoir computing.

Figure 5:
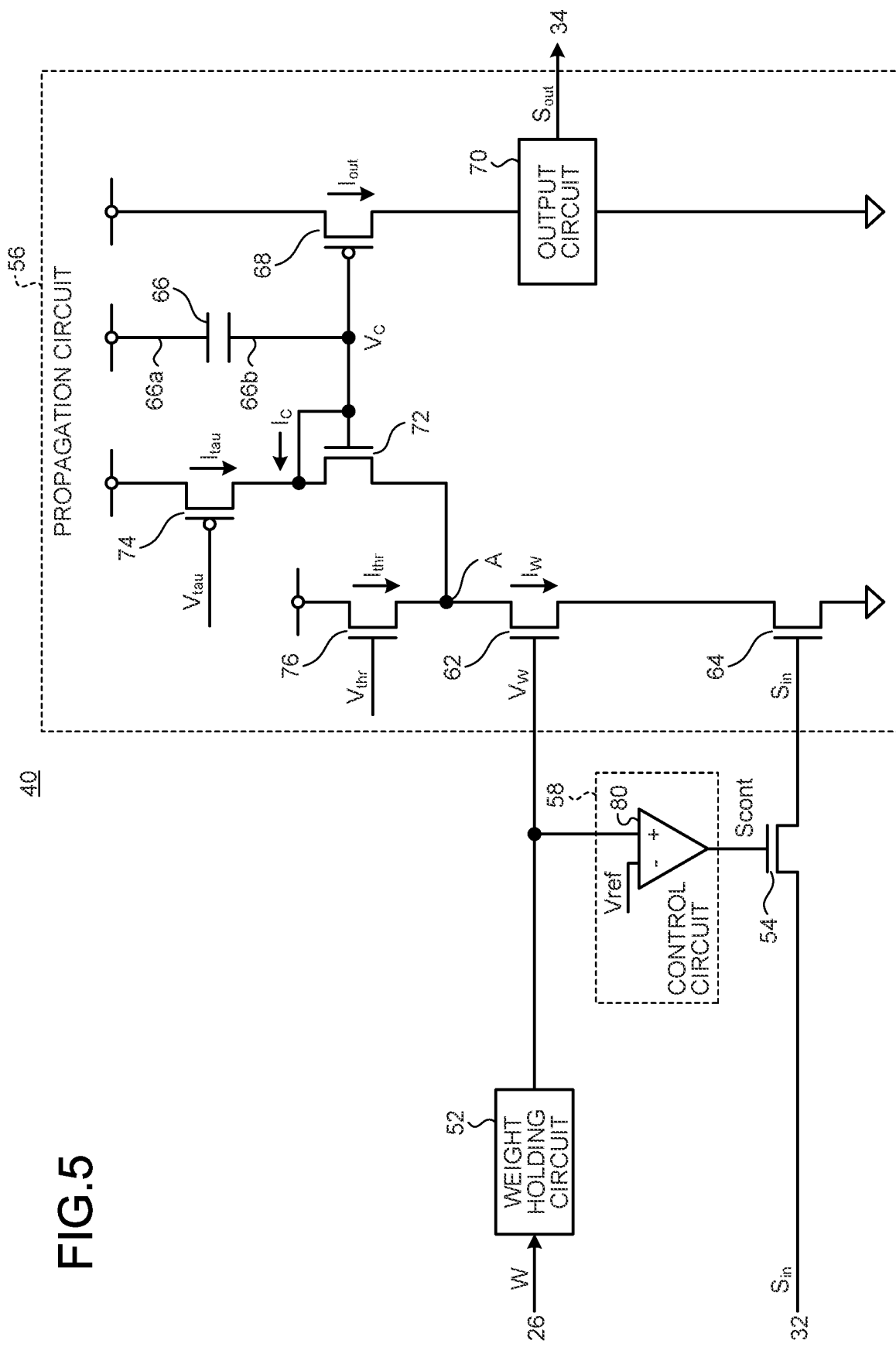
FIG. 5 is a diagram illustrating the configuration of a synaptic circuit.

FIG. 5 is a diagram illustrating the configuration of the synaptic circuit 40. The synaptic circuit 40 includes a weight holding circuit 52, a switch circuit 54, a propagation circuit 56, and a control circuit 58.

The weight holding circuit 52 holds the weight value (W) set by the learning circuit 26. The weight holding circuit 52 may include, for example, a variable resistor having a resistance value that changes in accordance with the weight value (W). The weight holding circuit 52 may include, for example, a holding capacitor that accumulates charges corresponding to the weight value (W). In addition, the weight holding circuit 52 may include a memory or the like and store a digital value corresponding to the weight value (W). In the present embodiment, the weight holding circuit 52 generates a weight voltage w) corresponding to the held weight value (W).

The switch circuit 54 receives a binary input signal ($S_{in}$) output from the pre-synaptic neuron circuit 32. The switch circuit 54 switches whether or not to give the received input signal ($S_{in}$) to the propagation circuit 56 in response to a control signal ($S_{cont}$). When the control signal ($S_{cont}$) indicates 1, the switch circuit 54 is turned on and gives the received input signal ($S_{in}$) to the propagation circuit 56. When the control signal ($S_{cont}$) indicates 0, the switch circuit 54 is turned off, and does not give the received input signal ($S_{in}$) to the propagation circuit 56.

In the present embodiment, the switch circuit 54 is a metal oxide semiconductor field effect transistor (MOS-FET). In the example of FIG. 5, the switch circuit 54 is an N-channel MOS-FET, In the switch circuit 54, which is a MOS-ITT, the control signal ($S_{cont}$) is applied to the gate by the control circuit 58, the input signal ($S_{in}$) is applied to the drain by the pre-synaptic neuron circuit 32, and the source is connected to the propagation circuit 56.

The propagation circuit 56 receives the input signal ($S_{in}$) from the pre-synaptic neuron circuit 32 through the switch circuit 54. Then, the propagation circuit 56 supplies, to the post-synaptic neuron circuit 34, an output signal ($S_{out}$) obtained by adding the influence of the weight value (W) to the input signal ($S_{in}$). For example, the propagation circuit 56 outputs the output signal ($S_{out}$) obtained by delaying the input signal ($S_{in}$) by a time corresponding to the weight value (W). In the present embodiment, the larger the weight value (W) is, the more the propagation circuit 56 shortens the delay time between the reception of the input signal ($S_{in}$) and the output of the output signal ($S_{out}$).

When the switch circuit 54 is in the off state, the propagation circuit 56 does not receive the input signal ($S_{in}$).

When the switch circuit 54 is in the off state, the propagation circuit 56 stops output of the output signal ($S_{out}$). For example, when the switch circuit 54 is in the off state, the propagation circuit 56 outputs the output signal ($S_{out}$) to be output in a state where the weight value (W) is the minimum value (for example, 0).

In the present embodiment, the propagation circuit 56 includes a weight current circuit 62, an input circuit 64, a capacitor 66, an output amplification circuit 68, an output circuit 70, a charge adjustment circuit 72, a first constant current circuit 74, and a second constant current circuit 76.

The weight current circuit 62 applies a weight current ($I_W$) having a current value corresponding to the weight value (W) set in the weight holding circuit 52. For example, the weight current circuit 62 applies the weight current ($I_W$) proportional to the weight value (W).

When the input circuit 64 is in the on state, the weight current circuit 62 draws the weight current ($I_W$) from a node A and applies it to a reference potential (ground). The weight current circuit 62 does not apply the weight current ($I_W$) when the input circuit 64 is in the off state. That is, the weight current circuit 62 sets the weight current to be 0.

In the present embodiment, the weight current circuit 62 is a MOS-FET. In the example of FIG. 5, the weight current circuit 62 is an N-channel MOS-FET.

In the weight current circuit 62, which is a MOS-ITT, the weight voltage ($V_W$) is applied to the gate, and the drain is connected to the node A. Then, the weight current circuit 62 being a MOS-FET applies, between the drain-source, the weight current ($I_W$) having a current amount corresponding to the weight voltage ($V_W$).

The input circuit 64 receives, through the switch circuit 54, the binary input signal ($S_{in}$) output from the pre-synaptic neuron circuit 32. When the switch circuit 54 is in the on state, the input circuit 64 switches whether or not to cause the weight current ($I_W$) to flow in the weight current circuit 62 in response to the binary input signal ($S_{in}$) output from the pre-synaptic neuron circuit 32. For example, the input circuit 64 causes the weight current ($I_W$) to flow in a case where the switch circuit 54 is in the on state and the input signal ($S_{in}$) indicates 1. For example, the input circuit 64 does not cause the weight current ($I_W$) to flow in a case where the switch circuit 54 is in the on state and the input signal ($S_{in}$) indicates 0. That is, the input circuit 64 sets the weight current ($I_W$) to be 0 when the switch circuit 54 is in the on state and the input signal ($S_{in}$) indicates 0. In addition, when the switch circuit 54 is in the off state, the input circuit 64 does not cause the weight current ($I_W$) to flow. That is, in the off state of the switch circuit 54, the input circuit 64 sets the weight current ($I_W$) to be 0 when the input signal ($S_{in}$) indicates 0.

In the present embodiment, the input circuit 64 is a MOS-FET that performs a switching operation. In the example of FIG. 5, the input circuit 64 is an N-channel MOS-FET. In the input circuit 64 being a MOS-FET, the input signal ($S_{in}$) is applied to the gate, the drain is connected to the source of the weight current circuit 62, and the source is connected to the reference potential (ground).

Then, the input circuit 64 being a MOS-FET is turned on when the switch circuit 54 is in the on state and the input signal ($S_{in}$) indicates 1. In this case, the input circuit 64 connects the source of the weight current circuit 62 to the ground in order to cause the weight current ($I_W$) to flow by the weight current circuit 62. The input circuit 64 being a MOS-FET is turned off when the switch circuit 54 is in the on state and the input signal ($S_{in}$) indicates 0. In this case, the input circuit 64 disconnects the source of the weight current circuit 62 from the ground in order not to cause the weight current ($I_W$) to flow by the weight current circuit 62, When the switch circuit 54 is in the off state, the input circuit 64 being a MOS-FET disconnects the source of the weight current circuit 62 from the ground in order not to cause the weight current ($I_W$) to flow by the weight current circuit 62.

The capacitor 66 includes a first terminal 66a and a second terminal 66b. The first terminal 66a of the capacitor 66 is connected to a power supply potential (e.g., VDD) at which a constant voltage is generated. In the capacitor 66, a constant voltage is applied to the first terminal 66a. In addition, the capacitor 66 generates a capacitor voltage ($V_C$) at the second terminal 66b. The capacitor voltage ($V_C$) is a value obtained by subtracting a voltage generated by the capacitor 66 from the power supply potential. The voltage generated by the capacitor 66 is a voltage obtained by dividing the accumulated charge amount by the capacitance.

The output amplification circuit 68 switches between the on state and the off state in accordance with the capacitor voltage ($V_C$) generated at the second terminal 66b of the capacitor 66. For example, the output amplification circuit 68 is in the on state when the capacitor voltage ($V_C$) is equal to or less than a threshold voltage ($V_t$), and is in the off state when the capacitor voltage ($V_C$) is larger than the threshold voltage ($V_t$).

The output amplification circuit 68 is, for example, a MOS-FET that performs a switching operation. In the example of FIG. 5, the output amplification circuit 68 is a P-channel MOS-FET. In the output amplification circuit 68 being a P-channel MOS-FET, the capacitor voltage ($V_C$) is applied to the gate, the source is connected to the power supply potential, and the drain is connected to the output circuit 70. Then, when the capacitor voltage ($V_C$) is equal to or less than the threshold voltage ($V_t$), the output amplification circuit 68 being a MOS-FET is in the on state and supplies an output current ($I_{out}$) to the output circuit 70. On the other hand, when the capacitor voltage ($V_C$) is larger than the threshold voltage ($V_t$), the output amplification circuit 68 being a MOS-FET is in the off state and stops the output of the output current ($I_{out}$).

The output circuit 70 outputs an output signal (San) corresponding to the capacitor voltage ($V_C$) generated at the second terminal 66b of the capacitor 66. The output circuit 70 outputs, for example, the binary output signal ($S_{out}$) obtained by binarizing the capacitor voltage ($V_C$) with the threshold voltage ($V_t$).

The output circuit 70 outputs the output signal ($S_{out}$) that takes a value of 1 when the output current ($I_{out}$) is supplied from the output amplification circuit 68 and takes a value of 0 when the output current ($I_{out}$) is not supplied from the output amplification circuit 68. That is, in this case, the output circuit 70 outputs the output signal ($S_{out}$) indicating 1 when the capacitor voltage ($V_C$) is equal to or less than the threshold voltage ($V_t$) and indicating 0 when the capacitor voltage ($V_C$) is larger than the threshold voltage ($V_t$).

It is to be noted that the output circuit 70 may output the output signal ($S_{out}$) that is a current having an analog value (continuous value), in this case, the output amplification circuit 68 does not perform a switching operation but functions as a current amplifier that applies the output current ($I_{out}$) having an analog value (continuous value) corresponding to the capacitor voltage ($V_C$). Then, the output circuit 70 outputs the output current ($I_{out}$) as it is as the output signal ($S_{out}$). Alternatively, the output circuit 70 may output, as the output signal ($S_{out}$), a voltage signal having an analog value (continuous value) corresponding to the output current ($I_{out}$).

When the weight current ($I_W$) is applied by the input circuit 64, the charge adjustment circuit 72 decreases or increases the charge accumulated in the capacitor 66 with a time change amount corresponding to the current value of the weight current ($I_W$). For example, when the input circuit 64 is in the on state, the charge adjustment circuit 72 decreases or increases the charge accumulated in the capacitor 66.

On the other hand, when the weight current ($I_W$) is not applied by the input circuit 64, the charge adjustment circuit 72 keeps the charge accumulated in the capacitor 66 constant. For example, when the input circuit 64 is in the off state, the charge adjustment circuit 72 does not change the charge accumulated in the capacitor 66.

The charge adjustment circuit 72 is, for example, a diode-connected MOS-ITT. In the example of FIG. 5, the charge adjustment circuit 72 is a diode-connected N-channel MOS-FET. In the charge adjustment circuit 72 being an N-channel MOS-FET, the gate and the drain are connected, the gate is connected to the second terminal 66b of the capacitor 66, and the source is connected to the node A. Then, when the weight current ($I_W$) is applied to the node A, the charge adjustment circuit 72 being a MOS-FET draws a capacitor current ($I_C$) from the second terminal 66b of the capacitor 66, and supplies it to the node A. Alternatively, the charge adjustment circuit 72 being a MOS-FET draws the capacitor current ($I_C$) from the node A, and supplies it to the second terminal 66b of the capacitor 66.

This allows the charge adjustment circuit 72 to decrease the capacitor voltage ($V_C$) when the weight current ($I_W$) is applied by the input circuit 64 and to keep the capacitor voltage ($V_C$) constant when the weight current ($I_W$) is not applied by the input circuit 64. Accordingly, the charge adjustment circuit 72 can decrease the capacitor voltage ($V_C$) when the input circuit 64 is in the on state, that is, when the input signal ($S_{in}$) indicates 1. In addition, the charge adjustment circuit 72 can keep the capacitor voltage ($V_C$) constant when the input circuit 64 is in the off state, that is, when the input signal ($S_{in}$) indicates 0.

When the weight current ($I_W$) is applied by the input circuit 64, the first constant current circuit 74 supplies a predetermined constant first current ($I_{tau}$) to the node A. The first constant current circuit 74 is, for example, a MOS-FET. In the example of FIG. 5, the first constant current circuit 74 is a P-channel MOS-FET. In the first constant current circuit 74, which is a P-channel MOS-FET, a predetermined constant first voltage ($V_{tau}$) is applied to the gate, the source is connected to the power supply potential, and the drain is connected to the drain of the charge adjustment circuit 72. Then, when the weight current ($I_W$) is applied by the input circuit 64, the first constant current circuit 74 supplies the first current ($I_{tau}$) to the node A through the charge adjustment circuit 72.

When the weight current ($I_W$) is applied by the input circuit 64, the second constant current circuit 76 supplies a predetermined constant second current ($I_{thr}$) to the node A. The second constant current circuit 76 is, for example, a MOS-FET. In the example of FIG. 5, the second constant current circuit 76 is an N-channel MOS-FET. In the second constant current circuit 76, which is an N-channel MOS-FET, a predetermined constant second voltage ($V_{thr}$) is applied to the gate, the drain is connected to the power supply potential, and the source is connected to the node A. Then, when the weight current ($I_W$) is applied by the input circuit 64, the second constant current circuit 76 supplies the second current ($I_{thr}$) to the node A via the charge adjustment circuit 72.

In the propagation circuit 56, the capacitor voltage ($V_C$) starts decrement from a first time ($t_1$) at which the input signal ($S_{in}$) changes from 0 to 1. Then, the output signal ($S_{out}$) changes from 0 to 1 at a time when the capacitor voltage ($V_C$) becomes equal to or less than the threshold voltage ($V_t$).

The time change amount of the capacitor voltage ($V_C$) varies in accordance with the magnitude of the weight current ($I_W$). The weight current ($I_W$) is a current amount corresponding to the weight value (W) held by the weight holding circuit 52.

Accordingly, the output signal ($S_{out}$) changes from 0 to 1 at the time delayed by the time corresponding to the weight value (W) from the first time at which the input signal ($S_{in}$) changed from 0 to 1. The larger the weight value (W) is, the shorter the delay time from when the input signal ($S_{in}$) changed from 0 to 1 to when the output signal ($S_{out}$) changes from 0 to 1 is. Therefore, the propagation circuit 56 can generate the output signal ($S_{out}$) obtained by delaying the input signal ($S_{in}$) received from the pre-synaptic neuron circuit 32 by a time corresponding to the weight value (W), and supply the generated output signal ($S_{out}$) to the post-synaptic neuron circuit 34.

The control circuit 58 receives the weight value (W) and a predetermined reference value. When the weight value (W) is equal to or larger than the reference value, the control circuit 58 causes the propagation circuit 56 to output the output signal ($S_{out}$) corresponding to the input signal ($S_{in}$) to the post-synaptic neuron circuit 34. When the weight value (W) is smaller than the reference value, the control circuit 58 causes the propagation circuit 56 to stop the output of the output signal ($S_{out}$) to the post-synaptic neuron circuit 34. For example, when the weight value (W) is equal to or larger than the reference value, the control circuit 58 turns on the switch circuit 54 to give the input signal ($S_{in}$) to the propagation circuit 56. When the weight value (W) is smaller than the reference value, the control circuit 58 turns off the switch circuit 54 not to give the input signal ($S_{in}$) to the propagation circuit 56.

In the present embodiment, the control circuit 58 includes a comparison circuit 80 such as a comparator. The comparison circuit 80 receives a weight voltage ($V_W$) corresponding to the set weight value (W) from the weight holding circuit 52. In addition, the comparison circuit 80 receives a reference value voltage ($V_{ref}$) corresponding to the preset reference value. Then, the comparison circuit 80 compares the weight voltage ($V_W$) with the reference value voltage ($V_{ref}$).

As a result of the comparison, when the weight voltage ($V_W$) is equal to or higher than the reference value voltage ($V_{ref}$), the comparison circuit 80 turns on the switch circuit 54 to give the input signal ($S_{in}$) to the propagation circuit 56. For example, the comparison circuit 80 sets the control signal ($S_{cont}$) to indicate 1 and turns on the switch circuit 54, which is a MOS-FET, when the weight voltage ($V_W$) is equal to or higher than the reference value voltage ($V_{ref}$). On the other hand, when the weight voltage ($V_W$) is smaller than the reference value voltage ($V_{ref}$), the comparison circuit 80 sets the control signal ($S_{cont}$) to indicate 0 and turns off the switch circuit 54 being a MOS-FET.

FIG. 6 is a diagram illustrating an example of a change in the weight value (W) for the number of times of learning when the control circuit 58 is not activated.

When the post-synaptic neuron circuit 34 fires in response to firing of the pre-synaptic neuron circuit 32, the learning circuit 26 increases the weight value (W) set for the synaptic circuit 40 between the pre-synaptic neuron circuit 32 and the post-synaptic neuron circuit 34 that have fired. Inversely, if the firing frequency of the pre-synaptic neuron circuit 32 is low, the learning circuit 26 decreases the weight value (W) set for the synaptic circuit 40 between the pre-synaptic neuron circuit 32 and the post-synaptic neuron circuit 34. Due to this, by the STDP learning, the learning circuit 26 can increase the weight value (W) of the synapse between neurons having strong association and decrease the weight value (W) between neurons having weak association.

Here, there is a case where the post-synaptic neuron circuit 34 fires frequently due to the influence of another pre-synaptic neuron circuit 32 even if the firing frequency of the pre-synaptic neuron circuit 32 is low. In such a case, if the control circuit 58 is not activated and the output of the output signal ($S_{out}$) from the propagation circuit 56 to the post-synaptic neuron circuit 34 is not stopped, the learning circuit 26 increases the weight value (W) set for the synaptic circuit 40 between the pre-synaptic neuron circuit 32 and the post-synaptic neuron circuit 34 having a low firing frequency. In this case, as illustrated in FIG. 6, there is a possibility that the learning circuit 26 increases, due to erroneous learning in the middle of learning, the weight value (W) decreasing as the learning progresses.

FIG. 7 is a diagram illustrating an example of a change in the weight value (W) for the number of times of learning when the control circuit 58 is activated. On the other hand, when the weight value (W) is smaller than the reference value, the control circuit 58 stops the output from the propagation circuit 56 to the post-synaptic neuron circuit 34. Therefore, when the weight value (W) becomes smaller than the reference value as the learning progresses, the synaptic circuit 40 stops transmission of the signal from the pre-synaptic neuron circuit 32 to the post-synaptic neuron circuit 34. As a result, the learning circuit 26 does not increase the weight value (W) set for the synaptic circuit 40. Therefore, as illustrated in FIG. 7, when the weight value (W) becomes smaller than the reference value due to the progress of learning, the learning circuit 26 can fix the weight value (W) to a value smaller than the reference value.

Figure 8:
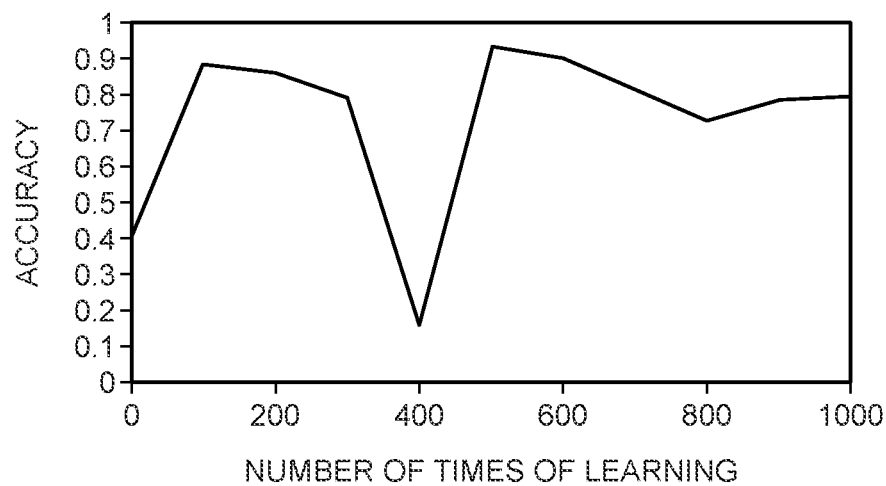
FIG. 8 is a diagram illustrating an example of accuracy for the number of times of learning in a case where output is not stopped.

FIG. 8 is a diagram illustrating an example of a change in accuracy for the number of times of learning when the control circuit 58 is not activated.

In a case where the control circuit 58 is not activated and the output of the output signal from the propagation circuit 56 to the post-synaptic neuron circuit 34 is not stopped, there is a possibility that the learning circuit 26 increases the weight value (W) between neurons having weak association due to erroneous learning. In this case, the accuracy of the neural network apparatus 10 does not increase even if the learning progresses. In the example illustrated in FIG. 8, the accuracy exceeds 0.9 when the number of times of learning is around 500 times, whereas the accuracy decreases to around 0.7 when the number of times of learning is around 700 times.

Figure 9:
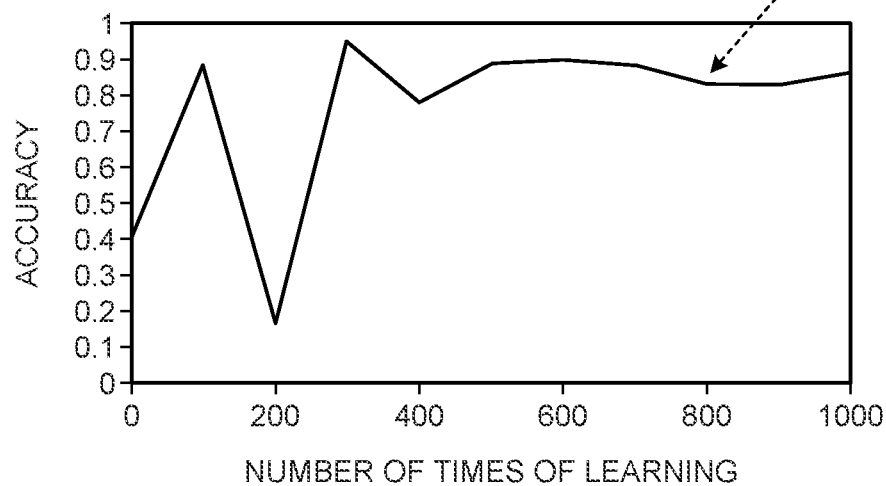
FIG. 9 is a diagram illustrating an example of accuracy for the number of times of learning in a case where output is stopped.

FIG. 9 is a diagram illustrating an example of a change in accuracy for the number of times of learning when the control circuit 58 is activated. FIG. 9 is a diagram illustrating a change in accuracy when the neural network apparatus 10 having the same network configuration as that of FIG. 8 is caused to learn by the same learning method.

In a case where the control circuit 58 is activated the weight value (W) between neurons having weak association is set to a value smaller than the reference value, and is then fixed to equal to or less than the reference value. Due to this, the synaptic circuit 40, to which the weight value (W) is set, stops transmission of the signal from the pre-synaptic neuron circuit 32 to the post-synaptic neuron circuit 34. As a result, the learning circuit 26 does not perform update of increasing the weight value (W). Therefore, accuracy deterioration factors caused by the progress of learning are reduced, and the learning circuit 26 can shorten the time for convergence of learning and can stabilize the accuracy of learning. In the example of FIG. 9, the accuracy is improved when the number of times of learning is around 800 times as compared with the example of FIG. 8.

As described above, the neural network apparatus 10 according to the present embodiment stops, in learning, output of the output signal to the post-synaptic neuron circuit 34 when the weight value (W) set for each of the synaptic circuits 40 is smaller than the reference value. Therefore, the neural network apparatus 10 according to the present embodiment can shorten the time for convergence of the learning and can stabilize the accuracy of learning.

Variation

Figure 10:
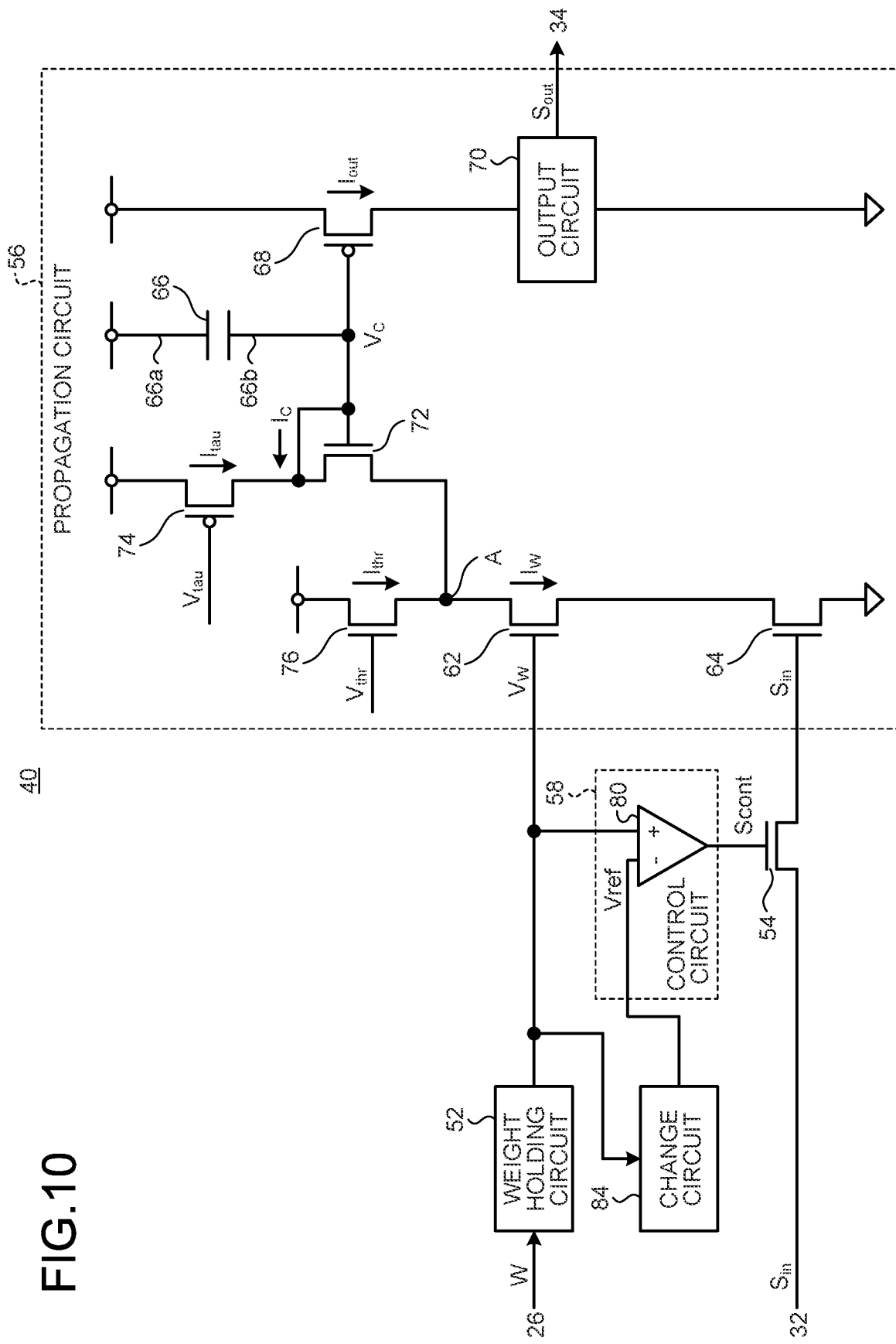
FIG. 10 is a diagram illustrating the configuration of a synaptic circuit according to a variation.

FIG. 10 is a diagram illustrating the configuration of a synaptic circuit 40 according to a variation. The neural network apparatus 10 according to the embodiment may include the synaptic circuit 40 according to a variation as illustrated in FIG. 10. The synaptic circuit 40 according to the variation has substantially the same configuration as the synaptic circuit 40 illustrated in FIG. 5 has, so that members having substantially the same functions and configurations are denoted by the same reference numerals, and a detailed description thereof will be omitted.

The synaptic circuit 40 according to the variation further includes a change circuit 84. The change circuit 84 receives the weight value (W) from the weight holding circuit 52. The change circuit 84 compares the weight value (W) with the current reference value, and changes the reference value in a stepwise manner based on the comparison result.

Specifically, when the weight value (W) is smaller than the reference value, the change circuit 84 decreases the reference value in a stepwise manner with the lapse of time with a preset lower limit reference value as a lower limit. That is, when the weight value (W) is smaller than the reference value, the change circuit 84 decreases the reference value in a stepwise manner with the lapse of time until the reference value becomes equal to or larger than the weight value (W) or the reference value reaches the louver limit reference value.

Furthermore, when the weight value (W) is equal to or larger than the reference value, the change circuit 84 increases the reference value in a stepwise manner with the lapse of time with the upper limit reference value larger than the lower limit reference value as an upper limit. That is, when the weight value (W) is equal to or larger than the reference value, the change circuit 84 increases the reference value in a stepwise manner with the lapse of time until the reference value becomes smaller than the weight value (W), or until the reference value reaches the upper limit reference value.

Figure 11:
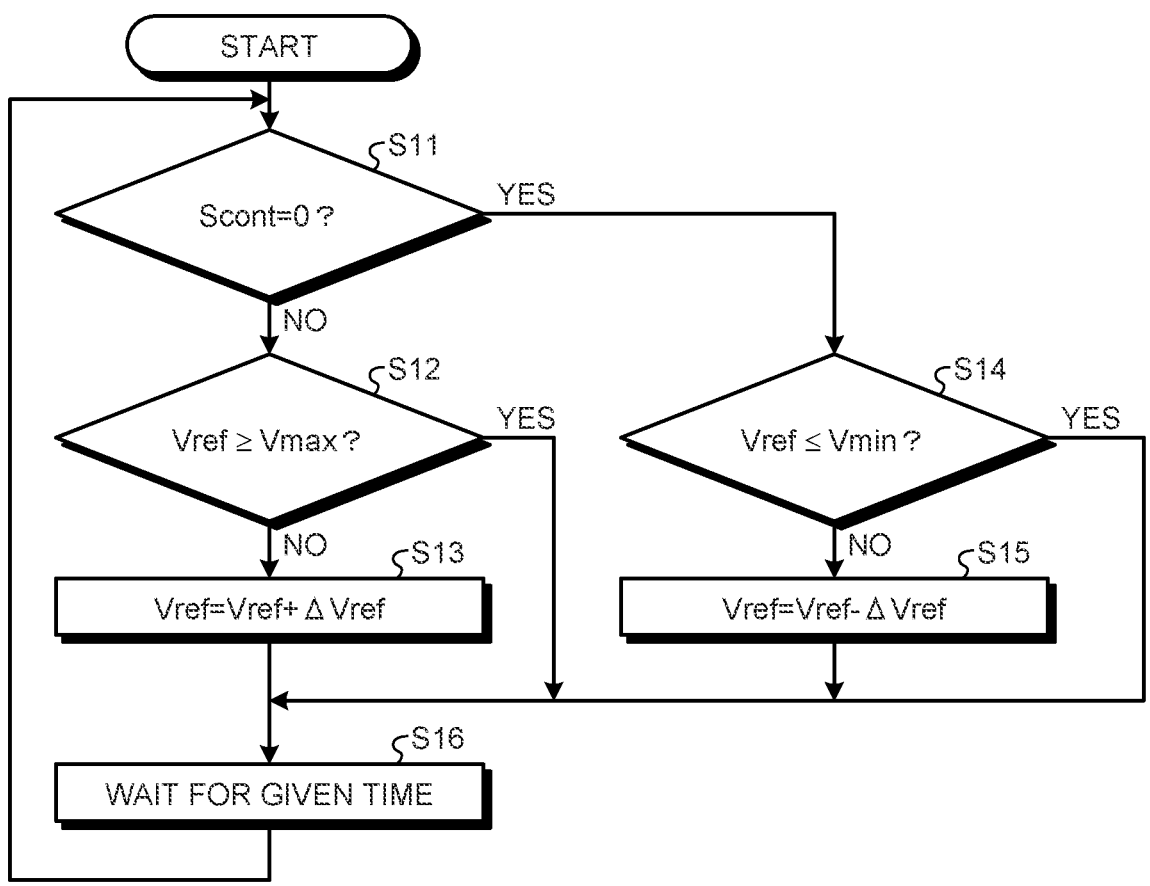
FIG. 11 is a diagram illustrating a flow of processing of a change circuit.

FIG. 11 is a diagram illustrating a flow of processing of the change circuit 84. In the circuit example illustrated in FIG. 10, the change circuit 84 executes the processing with a flow illustrated in FIG. 11.

First, in S11, the change circuit 84 determines whether or not the control signal ($S_{cont}$) output from the comparison circuit 80 indicates 0. Note that the comparison circuit 80 sets the control signal ($S_{cont}$) to indicate 1 when the weight voltage ($V_W$) is equal to or higher than the reference value voltage ($V_{ref}$), and sets the control signal ($S_{cont}$) to indicate 0 when the weight voltage ($V_W$) is lower than the reference value voltage ($V_{ref}$). Therefore, in S11, the change circuit 84 can determine whether or not the weight voltage ($V_W$) is smaller than the reference value voltage ($V_{ref}$).

In response to determining that the control signal ($S_{cont}$) does not indicate 0, that is, when the weight voltage ($V_W$) is equal to or higher than the reference value voltage ($V_{ref}$) (No in S11), the change circuit 84 advances the processing to S12. In response to determining that the control signal ($S_{cont}$) indicates 0, that is, when the weight voltage ($V_W$) is smaller than the reference value voltage ($V_{ref}$) (Yes in S11), the change circuit 84 advances the processing to S14.

In S12, the change circuit 84 determines whether or not the reference value voltage ($V_{ref}$) is equal to or higher than an upper limit voltage ($V_{max}$). Note that the upper limit voltage ($V_{max}$) is a voltage corresponding to the upper limit reference value. In response to determining that the reference value voltage ($V_{ref}$) is equal to or higher than the upper limit voltage ($V_{max}$) (Yes in S12), the change circuit 84 advances the processing to S16. In response to determining that the reference value voltage ($V_{ref}$) is smaller than the upper limit voltage ($V_{max}$) (No in S12), the change circuit 84 advances the processing to S13.

In S13, the change circuit 84 adds a minute voltage ($\Delta V_{ref}$) to the reference value voltage ($V_{ref}$). The minute voltage ($\Delta V_{ref}$) is, for example, a voltage obtained by dividing a difference between the upper limit voltage and a lower limit voltage ($V_{min}$) by a predetermined integer. The lower limit voltage a is a voltage corresponding to the lower limit reference value.

By executing the processing of S12 and S13, the change circuit 84 can increase the reference value voltage ($V_{ref}$) in a stepwise manner with the upper limit voltage ($V_{max}$) as an upper limit when the weight voltage ($V_W$) is equal to or higher than the reference value voltage ($V_{ref}$). When the step of S13 ends, the change circuit 84 advances the processing to S16.

In S14, the change circuit 84 determines whether or not the reference value voltage ($V_{ref}$) is equal to or lower than the lower limit voltage ($V_{min}$). In response to determining that the reference value voltage ($V_{ref}$) is equal to or lower than the lower limit voltage ($V_{min}$) (Yes in S14), the change circuit 84 advances the processing to S16. In response to determining that the reference value voltage ($V_{ref}$) is larger than the lower limit voltage ($V_{min}$) (No in S14), the change circuit 84 advances the processing to S15.

In S15, the change circuit 84 subtracts the minute voltage ($\Delta V_{ref}$) from the reference value voltage ($V_{ref}$). By executing the processing of S14 and S15, the change circuit 84 can decrease the reference value voltage ($V_{ref}$) in a stepwise manner with the lower limit voltage ($V_{min}$) as the lower limit when the weight voltage ($V_{ref}$) is smaller than the reference value voltage ($V_{ref}$). When the step of S15 ends, the change circuit 84 advances the processing to S16.

In S16, the change circuit 84 waits for the processing for a given period of time, and then returns the processing to S11. As a result, the change circuit 84 can increase or decrease the reference value voltage ($V_{ref}$) with the lapse of time.

By repeatedly executing the above processing S11 to S16, the change circuit 84 can decrease the reference value in a stepwise manner with the lapse of time with the lower limit reference value as the lower limit when the weight value (W) is smaller than the reference value. The change circuit 84 can increase the reference value in a stepwise manner with the lapse of time with the upper limit reference value larger than the lower limit reference value as the upper limit when the weight value (W) is equal to or larger than the reference value.

After fixing the weight value (W) in a state of being smaller than the reference value, the synaptic circuit 40 according to the present variation can release the fixing function and increase the weight value (W) again. As a result, after a given time has elapsed, the synaptic circuit 40 can learn the weight value (W) to an appropriate value when the input information for learning is changed. For example, by setting the lower limit reference value to the minimum value that can be taken by the weight value (W), the synaptic circuit 40 can reliably release the fixing function.

In addition, after releasing the fixing function, the synaptic circuit 40 increases the reference value in a stepwise manner until it reaches the upper limit reference value with lapse of time, and hence it can validate the fixing function again. The neural network apparatus 10 according to such a variation can shorten the time for convergence of learning and can stabilize the accuracy of the learning even in a case where the learning is performed in correspondence with various types of input information.

In the change circuit 84 according to the variation, instead of the processing described above, the change circuit 84 may change the reference value to the lower limit reference value after a preset time elapses since the timing at which the weight value (W) becomes smaller than the reference value. Furthermore, the change circuit 84 may change the reference value to the upper limit reference value after a preset time elapses since the timing at which the weight value (W) becomes equal to or larger than the reference value.

Even in the case, after fixing the weight value (W) by the weight value (W) becoming smaller than the reference value, the synaptic circuit 40 according to the variation can release the fixing function and increase the weight value (W) again Furthermore, after releasing the fixing function, the synaptic circuit 40 according to the variation can increase the reference value until it reaches the upper limit reference value with lapse of time, and validate the fixing function again.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A synaptic circuit in which a weight value changed by learning is set, the synaptic circuit receiving a binary input signal indicative of a first value or a second value from a pre-synaptic neuron circuit and outputting an output signal to a post-synaptic neuron circuit, the post-synaptic neuron circuit configured to output a binary firing signal, the synaptic circuit comprising:
    a learning circuit configured to update the weight value by spike-timing-dependent synaptic plasticity learning based on the input signal and the firing signal;
    a propagation circuit configured to supply, to the post-synaptic neuron circuit, either the output signal represented by an analog value corresponding to the weight value or the output signal obtained by delaying the input signal a time corresponding to the weight value, when the input signal changes from the second value to the first value; and
    a control circuit configured to stop output of the output signal from the propagation circuit to the post-synaptic neuron circuit when the weight value is smaller than a predetermined reference value.

2. The synaptic circuit according to claim 1, wherein the propagation circuit shortens a delay time between reception of the input signal and output of the output signal as the weight values is larger.

3. The synaptic circuit according to claim 1, further comprising a switch circuit configured to receive the input signal from the pre-synaptic neuron circuit and switch whether or not to give the input signal to the propagation circuit,
    wherein the control circuit
        turns on the switch circuit to give the input signal to the propagation circuit when the weight value is equal to or larger than the reference value, and
        turns off the switch circuit not to give the input signal to the propagation circuit when the weight value is smaller than the reference value.

4. The synaptic circuit according to claim 3, further comprising a weight holding circuit configured to generate a weight voltage corresponding to the weight value,
    wherein the control circuit
        receives a reference value voltage corresponding to the reference value and compares the reference value voltage with the weight voltage,
        turns on the switch circuit to give the input signal to the propagation circuit when the weight voltage is equal to or higher than the reference value voltage, and
        turns off the switch circuit not to give the input signal to the propagation circuit when the weight voltage is smaller than the reference value voltage.

5. The synaptic circuit according to claim 1, wherein the propagation circuit includes:
    a weight current circuit configured to cause, to flow, a weight current having a current value corresponding to the weight value;
    an input circuit configured to switch, based on the input signal, whether or not to cause the weight current to flow by the weight current circuit;
    a capacitor including a first terminal and a second terminal, the first terminal being given a constant voltage;
    an output circuit configured to output the output signal corresponding to a capacitor voltage generated at the second terminal; and
    a charge adjustment circuit configured to, when the weight current is flowed by the switching of the input circuit, decrease or increase charges accumulated in the capacitor by
        drawing, from the second terminal, a capacitor current corresponding to a current value of the weight current, or
        supplying the capacitor current to the second terminal.

6. The synaptic circuit according to claim 1, further comprising a change circuit configured to change the reference value by:
    decreasing the reference value in a stepwise manner with a lapse of time with a preset lower limit reference value as a lower limit when the weight value is smaller than the reference value; and
    increasing the reference value in a stepwise manner with a lapse of time with an upper limit reference value larger than the lower limit reference value as an upper limit when the weight value is equal to or larger than the reference value.

7. The synaptic circuit according to claim 1, further comprising a change circuit configured to change the reference value to a lower limit reference value after a preset time elapses since timing at which the weight value becomes smaller than the reference value, and change the reference value to an upper limit reference value larger than the lower limit reference value after a preset time elapses since timing at which the weight value becomes equal to or larger than the reference value.

8. A neural network apparatus comprising:
the synaptic circuit according to claim 1.

9. The neural network apparatus according to claim 8, further comprising a recursive structure in which a signal output from a first layer in a plurality of layers is fed back to the first layer or to a layer arranged in a stage before the first layer.

10. The synaptic circuit according to claim 1, wherein the weight value is represented by Equation (1):

$$W_{ij}(t+\Delta t) = W_{ij}(t) + \Delta W_{ij}(t) \quad (1)$$

where
$\Delta t$ denotes a unit time,
t denotes a time,
$(t+\Delta t)$ denotes a time after the unit time $\Delta t$ has elapsed from the time t,
$W_{ij}(t)$ represents the weight value at the time (t), and
$W_{ij}(t+t\Delta)$ represents the weight value at the time $t+\Delta t$, and the learning circuit updates the weight value in accordance with Equation (2):

$$\Delta W_{ij}(t) = \eta_{STDP}(x_i(t) \times x_j(t-\Delta t) - x_i(t-\Delta t) \times x_j(t)) \quad (2)$$

Where
$(t-\Delta t)$ denotes a time before the unit time $\Delta t$ from the time t,
$\eta_{STDP}$ denotes a predetermined constant,
$x_i(t)$ denotes 0 or 1, denoting a value of the firing signal at the time t,
$x_j(t)$ denotes 0 or 1, denoting a value of the input signal at the time t,
$x_i(t-\Delta t)$ denotes 0 or 1, denoting a value of the firing signal at the time $t-\Delta t$, and
$x_j(t-\Delta t)$ denotes 0 or 1, denoting a value of the input signal at the time $t-\Delta t$.

11. A signal processing method, comprising:
by a circuit, performing signal processing in accordance with a neural network, wherein
the neural network comprises:
a first neuron configured to output a binary input signal indicative of a first value or a second value,
a synapse to which a weight value changed by learning is set, and
a second neuron configured to acquire an output signal from the synapse and output a binary firing signal; and
the method comprises:
by the circuit, updating the weight value by spike-timing-dependent synaptic plasticity learning based on the input signal and the firing signal;
when the weight value is equal to larger than a predetermined reference value,
propagating, by the circuit, either the output signal represented by an analog value corresponding to the weight value or the output signal obtained by delaying the input signal a time corresponding to the weight value from the synapse to the first neuron, when the input signal changes from the second value to the first value; and
when the weight value is smaller than the predetermined reference value,
stopping, by the circuit, propagating of the output signal from the synapse to the second neuron.

* * * * *